(12) United States Patent
Anklam et al.

(10) Patent No.: US 11,981,317 B2
(45) Date of Patent: May 14, 2024

(54) SYSTEMS AND METHODS TO ASSIGN TRAVEL ROUTES TO ALTERNATIVE ENERGY VEHICLES

(71) Applicant: Ford Global Technologies, LLC, Dearborn, MI (US)

(72) Inventors: Nicole Anklam, Livonia, MI (US); Wendy L. MacLennan, Northville, MI (US); Anthony Melatti, Canton, MI (US); Patrick Gordon Collins, Canton, MI (US); Yevgeniya Sosonkina, Birmingham, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 252 days.

(21) Appl. No.: 17/204,667

(22) Filed: Mar. 17, 2021

(65) Prior Publication Data

US 2022/0297663 A1    Sep. 22, 2022

(51) Int. Cl.
*G08G 1/00*    (2006.01)
*B60L 58/12*    (2019.01)
(Continued)

(52) U.S. Cl.
CPC .............. *B60W 10/08* (2013.01); *B60L 58/12* (2019.02); *B60W 10/26* (2013.01); *B60W 40/06* (2013.01);
(Continued)

(58) Field of Classification Search
CPC ...... B60W 10/08; B60W 10/26; B60W 40/06; B60W 40/105; B60W 2510/083;
(Continued)

(56) References Cited

U.S. PATENT DOCUMENTS 9,384,597 B2    7/2016 Koch et al.
10,379,533 B2   8/2019 Bier et al.
(Continued)

FOREIGN PATENT DOCUMENTS

EP    1890110    † 2/2008
WO    2021159955   † 2/2020

OTHER PUBLICATIONS

A. Shahzada et al. "Dynamic Vehicle Navigation: An A* Algorithm Based Approach Using Traffic and Road Information" 2011 International Conference on Computer Applications and Industrial Electronics. pp. 514-518.
M. Levin et al. "Effect of Road Grade on Networkwide Vehicle Energy Consumption and Ecorouting" Transportation Research Record: Journal of the Transportation Research Board, No. 2427 (2014) pp. 26-33.

*Primary Examiner* — Jess Whittington
*Assistant Examiner* — Rami Nabih Bedewi
(74) *Attorney, Agent, or Firm* — Brandon Hicks; Eversheds Sutherland (US) LLP

(57) ABSTRACT

The disclosure generally pertains to systems and methods for assigning alternative energy vehicles to travel routes based on vehicle wear-and-tear ratings. Wear-and-tear ratings may be influenced by factors such as, for example, road grade, travel speed, electric motor use, and battery use, on various travel routes. An example method for determining a wear-and-tear rating of an alternative energy vehicle may involve determining an amount of stress imposed upon an electric motor of an alternative energy vehicle due to a grade of a road on a travel route, and an amount of energy consumed from a battery of the alternative energy vehicle due to a speed of travel on the travel route. The wear-and-tear rating of the alternative energy vehicle may then be determined based on the amount of stress imposed upon the electric motor and/or the amount of energy consumed from the battery on the travel route.

6 Claims, 9 Drawing Sheets

(51) Int. Cl.
  *B60W 10/08*   (2006.01)
  *B60W 10/26*   (2006.01)
  *B60W 40/06*   (2012.01)
  *B60W 40/105*  (2012.01)
  *G01C 21/34*   (2006.01)
  *G07C 5/08*    (2006.01)
  *G08G 1/01*    (2006.01)

(52) U.S. Cl.
  CPC ........... *B60W 40/105* (2013.01); *G08G 1/202* (2013.01); *B60L 2240/423* (2013.01); *B60W 2510/083* (2013.01); *B60W 2510/242* (2013.01)

(58) Field of Classification Search
  CPC .............. B60W 2510/242; B60L 58/12; B60L 2240/423; G08G 1/202
  See application file for complete search history.

(56) References Cited

U.S. PATENT DOCUMENTS

| | | | |
|---|---|---|---|
| 2011/0238457 A1* | 9/2011 | Mason ........... | G06Q 10/063112 |
| | | | 705/7.14 |
| 2019/0225245 A1* | 7/2019 | Kulkarni ................. | B61L 3/006 |
| 2020/0004241 A1 | 1/2020 | Levinson et al. | |
| 2020/0193549 A1 | 6/2020 | Pedersen et al. | |
| 2021/0300199 A1* | 9/2021 | Legnedahl .............. | B60L 53/64 |
| 2022/0034678 A1* | 2/2022 | Chintakindi ...... | B60W 60/0051 |
| 2022/0366739 A1* | 11/2022 | Hallberg .............. | G07C 5/0808 |

\* cited by examiner
† cited by third party

| Speed Categories | Weighting Factor |
|---|---|
| Speed < 40 mph | 1 |
| 40 mph < Speed < 60 mph | 2 |
| Speed > 60 mph | 3 |

FIG. 3

| Speed Categories | Weighting Factor | Route A % Segment | Battery Stress |
|---|---|---|---|
| Speed < 40 mph | 1 | 70 | 70 |
| 40 mph < Speed < 60 mph | 2 | 20 | 40 |
| Speed > 60 mph | 3 | 10 | 30 |
| | | | Wear-and-Tear Rating: 140 |

FIG. 4

| Speed Categories | Weighting Factor | Route B % Segment | Battery Stress |
|---|---|---|---|
| Speed < 40 mph | 1 | 20 | 20 |
| 40 mph < Speed < 60 mph | 2 | 30 | 60 |
| Speed > 60 mph | 3 | 50 | 150 |
| | | | Wear-and-Tear Rating: 230 |

FIG. 5

| Road Grade Categories | Weighting Factor |
|---|---|
| Grade < 5% | 1 |
| 5% < Grade < 10% | 2 |
| Grade > 10% | 3 |

FIG. 6

| Road Grade Categories | Weighting Factor | Route A % Segment | Motor Stress |
|---|---|---|---|
| Grade < 5% | 1 | 80 | 80 |
| 5% < Grade < 10% | 2 | 10 | 20 |
| Grade > 10% | 3 | 10 | 30 |
| | | | Wear-and-Tear Rating: 130 |

FIG. 7

| Road Grade Categories | Weighting Factor | Route B % Segment | Motor Stress |
|---|---|---|---|
| Grade < 5% | 1 | 20 | 20 |
| 5% < Grade < 10% | 2 | 25 | 50 |
| Grade > 10% | 3 | 55 | 165 |
| | | | Wear-and-Tear Rating: 235 |

FIG. 8

| Electric Motor Usage Categories | Weighting Factor |
|---|---|
| Low Torque / Low Speed | 1 |
| Medium Torque / Medium Speed | 2 |
| High Torque / High Speed | 3 |

FIG. 9

| Electric Motor Usage Categories | Weighting Factor | Route A Battery Consumption | Battery Stress |
|---|---|---|---|
| Low Torque / Low Speed | 1 | 5 kWh | 5 |
| Medium Torque / Medium Speed | 2 | 10 kWh | 20 |
| High Torque / High Speed | 3 | 9 kWh | 27 |
| | | | Wear-and-Tear Rating: 52 |

FIG. 10

| Electric Motor Usage Categories | Weighting Factor | Route B Battery Consumption | Battery Stress |
|---|---|---|---|
| Low Torque / Low Speed | 1 | 2 kWh | 2 |
| Medium Torque / Medium Speed | 2 | 15 kWh | 30 |
| High Torque / High Speed | 3 | 20 kWh | 60 |
| | | | Wear-and-Tear Rating: 92 |

FIG. 11

| Battery Use Categories | Weighting Factor |
|---|---|
| Low Use | 1 |
| Medium Use | 2 |
| High Use | 3 |

FIG. 12

| Battery Use Categories | Weighting Factor | Route A % Segment | Battery Stress |
|---|---|---|---|
| Low Use | 1 | 50 | 50 |
| Medium Use | 2 | 40 | 80 |
| High Use | 3 | 10 | 30 |
| | | | Wear-and-Tear Rating: 160 |

FIG. 13

| Battery Use Categories | Weighting Factor | Route B % Segment | Battery Stress |
|---|---|---|---|
| Low Use | 1 | 10 | 10 |
| Medium Use | 2 | 25 | 50 |
| High Use | 3 | 65 | 195 |
| | | | Wear-and-Tear Rating: 255 |

FIG. 14

|  | Travel Route 1 | Travel Route 2 | Travel Route 3 | Travel Route 4 | Travel Route 5 |
| --- | --- | --- | --- | --- | --- |
| Time Period 1 | Vehicle A | Vehicle B | Vehicle C | Vehicle D | Vehicle E |
| Time Period 2 | Vehicle E | Vehicle A | Vehicle B | Vehicle C | Vehicle D |
| Time Period 3 | (Abandoned) | Vehicle B Vehicle E | Vehicle A | Vehicle C | ~~Vehicle D~~ Vehicle F |

FIG. 15

SYSTEMS AND METHODS TO ASSIGN TRAVEL ROUTES TO ALTERNATIVE ENERGY VEHICLES

BACKGROUND

Fleet operators have significant experience in operating fleets of gasoline (or internal combustion engine) vehicles. Some of these experiences such as, for example, scheduling and package tracking, may be transferred to operations associated with alternative energy vehicles. However, experience gained from certain operations such as, for example, vehicle maintenance and repairs of gasoline vehicles, may not be readily transferable to operations associated with alternative energy vehicles. Oil change schedules and gasoline engine repairs, for example, are inapplicable to alternative energy vehicles. Consequently, a need exists to address certain operational aspects associated with alternative energy vehicles.

DESCRIPTION OF THE FIGURES

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

FIG. 3 shows a table indicating example speed categories that may be used to determine wear-and-tear on an alternative energy vehicle in accordance with the disclosure.

FIG. 4 shows a table that illustrates a first example determination of a wear-and-tear rating of an alternative energy vehicle based on speed-related battery stress in an example scenario in accordance with the disclosure.

FIG. 5 shows a table that illustrates a second example determination of a wear-and-tear rating of an alternative energy vehicle based on speed-related battery stress in another example scenario in accordance with the disclosure.

FIG. 6 shows a table indicating example road grade categories that may be used to determine wear-and-tear on an alternative energy vehicle in accordance with the disclosure.

FIG. 7 shows a table that illustrates a third example determination of a wear-and-tear rating of an alternative energy vehicle based on road grade-related electric motor stress in an example scenario in accordance with the disclosure.

FIG. 8 shows a table that illustrates a fourth example determination of a wear-and-tear rating of an alternative energy vehicle based on road grade-related electric motor stress in another example scenario in accordance with the disclosure.

FIG. 9 shows a table indicating example electric motor use categories that may be used to determine wear-and-tear on an alternative energy vehicle in accordance with the disclosure.

FIG. 10 shows a table that illustrates a fifth example determination of a wear-and-tear rating of an alternative energy vehicle based on electric motor use-related battery stress in an example scenario in accordance with the disclosure.

FIG. 11 shows a table that illustrates a sixth example determination of a wear-and-tear rating of an alternative energy vehicle based on electric motor use-related battery stress in another example scenario in accordance with the disclosure.

FIG. 12 shows a table indicating example battery use categories that may be used to determine wear-and-tear on an alternative energy vehicle in accordance with the disclosure.

FIG. 13 shows a table that illustrates a seventh example determination of a wear-and-tear rating of an alternative energy vehicle based on battery use-related battery stress in an example scenario in accordance with the disclosure.

FIG. 14 shows a table that illustrates an eighth example determination of wear-and-tear rating of an alternative energy vehicle based on battery use-related battery stress in an example scenario in accordance with the disclosure.

FIG. 15 shows an example table that shows travel route assignments for several alternative energy vehicles over several time periods in accordance with an embodiment of the disclosure.

DETAILED DESCRIPTION

Overview

Figure 1:
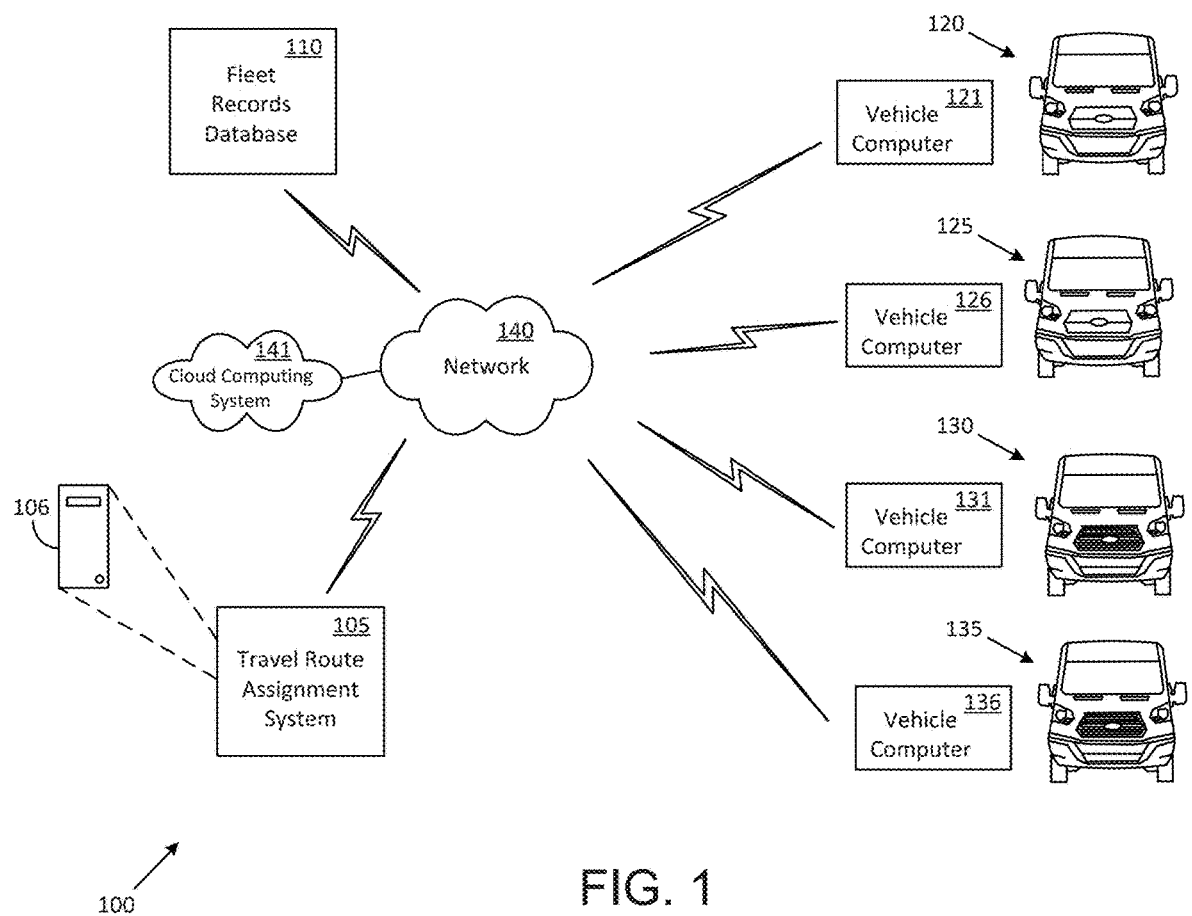
FIG. 1 shows an example fleet system that includes alternative energy vehicles in accordance with an embodiment of the disclosure.

The disclosure generally pertains to systems and methods for assigning alternative energy vehicles to travel routes based on vehicle wear-and-tear ratings. Wear-and-tear ratings may be influenced by factors such as, for example, road grade, travel speed, electric motor use, and battery use, on various travel routes. An example method for determining a wear-and-tear rating of an alternative energy vehicle may involve determining an amount of stress imposed upon an electric motor of an alternative energy vehicle due to a grade of a road on a travel route, and an amount of energy consumed from a battery of the alternative energy vehicle due to a speed of travel on the travel route. The wear-and-tear rating of the alternative energy vehicle may then be determined based on the amount of stress imposed upon the electric motor and/or the amount of energy consumed from the battery on the travel route.

Illustrative Embodiments

The disclosure will be described more fully hereinafter with reference to the accompanying drawings, in which example embodiments of the disclosure are shown. This disclosure may, however, be embodied in many different forms and should not be construed as limited to the example embodiments set forth herein. It will be apparent to persons skilled in the relevant art that various changes in form and detail can be made to various embodiments without departing from the spirit and scope of the present disclosure. Thus, the breadth and scope of the present disclosure should not be limited by any of the above-described example embodiments but should be defined only in accordance with the following claims and their equivalents. The description below has been presented for the purposes of illustration and is not intended to be exhaustive or to be limited to the precise form disclosed. It should be understood that alternate implementations may be used in any combination desired to form additional hybrid implementations of the present disclosure. For example, any of the functionalities described with respect to a particular device or component may be performed by another device or component. Furthermore, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments.

Certain words and phrases are used herein solely for convenience and such words and terms should be interpreted as referring to various objects and actions that are generally understood in various forms and equivalencies by persons of ordinary skill in the art. For example, the word "vehicle" as used in this disclosure can pertain to any of various types of vehicles, such as, for example, a truck, a semi-trailer, a flatbed, a car, a van, a sports utility vehicle, and a bus. A fleet of vehicles as used for purposes of description below can include a number of alternative energy vehicles as well as one or more conventional fuel vehicles in some cases. The fleet of vehicles may be owned by an individual or can be used for commercial purposes (FEDEX®, UPS®, USPS®, etc.). A few examples of alternative energy vehicles are: electric vehicles, hybrid electric-gasoline vehicles, plug-in hybrid electric-gasoline vehicles, and fuel cell vehicles. It must be understood that subject matter disclosed herein with respect to an "electric vehicle" can be equally applicable to various other types of alternative energy vehicles. For example, description related to a battery capacity of an electric vehicle should be understood as being equally applicable to a battery capacity of a plug-in hybrid electric-gasoline vehicle. The word "battery" as used herein is not limited to a single battery and can include a battery system having a bank of batteries that provides electrical power to one or motors coupled to the wheels of an electric vehicle. The word "grade" as used herein must be understood to encompass alternative words such as, for example, "gradient, and "slope" that indicate an incline of a driving surface (a road, for example). The phrase "wear-and-tear" is applicable to individual components of an alternative energy vehicle (battery, tires, brakes, etc.) as well as to the alternative energy vehicle as a whole (overall condition of the alternative energy vehicle). It must be understood that wear-and-tear on one component (an electric motor, for example) may lead to wear-and-tear on other components of a vehicle (excessive wear on tires, mechanical misalignments, etc.).

FIG. 1 shows an example vehicle assignment system 100 that may be used to assign travel routes to various types of vehicles in accordance with an embodiment of the disclosure. The example vehicle assignment system 100 may include a travel route assignment system 105, a fleet records database 110, and a fleet of vehicles. In this example scenario, the fleet of vehicles includes an electric vehicle 120, an electric vehicle 125, a plug-in hybrid electric-gasoline vehicle 130, and a gasoline vehicle 135. In other scenarios the fleet of vehicles may include fewer or more than three other vehicles that may be electric vehicles or other types of alternative energy vehicles, and may or may not include gasoline vehicles.

The travel route assignment system 105 may include one or more computers communicatively coupled to a network 140, such as, for example, a computer 106 that is communicatively coupled to the network 140. The computer 106 may be any of various types of computers containing a processor and a memory such as, for example, a server computer, a client computer, a desktop computer, a laptop computer, a tablet computer, or a handheld device (a smartphone, for example). The computer 106 may be operated by various entities such as, for example, a fleet operator who operates the fleet of vehicles (a dispatcher, a manager, an administrator etc.).

The fleet records database 110 may also include one or more computers (not shown) that are communicatively coupled to the network 140. The electric vehicle 120 may include a vehicle computer 121 that is communicatively coupled to the network 140. The electric vehicle 125 may include a vehicle computer 126 that is communicatively coupled to the network 140. The plug-in hybrid electric-gasoline vehicle 130 may include a vehicle computer 131 that is communicatively coupled to the network 140. The gasoline vehicle 135 may include a vehicle computer 136 that is communicatively coupled to the network 140.

A cloud computing system 141 that is coupled to the network 140 (or can be a part of the network 140) may include one or more computers and one or more data storage elements that offer cloud-based computing and/or storage services.

The network 140 may include any one network, or a combination of networks, such as, for example, a local area network (LAN), a wide area network (WAN), a telephone network, a cellular network, a cable network, a wireless network, and/or private/public networks such as the Internet. The various components that are communicatively coupled to the network 140 may communicate with each other by using various communication technologies such as, for example, TCP/IP, Bluetooth, cellular, near-field communication (NFC), Wi-Fi, Wi-Fi direct, vehicle-to-vehicle (V2V) communication, and/or vehicle-to-infrastructure (V2I) communication.

Various operations in accordance with an embodiment of the disclosure may be executed by launching a software application in any of various computers of the vehicle assignment system 100. The software application may obtain information from various sources via the network 140. For example, a software application execute in the computer 106 may obtain various records of one or more vehicles from the fleet records database 110. The records stored in the fleet records database 110 can include, for example, details of various travel routes (distances, cities, towns, charging station locations, eateries, GPS information, weather at various times, etc.), details of various roads on travel routes, (speed limits, grade, traffic regulations, traffic lights, etc.), assignment details for various drivers (previous route assignments, driver availability, driving record, etc.), and data obtained from various vehicle computers and/or drivers of vehicles that have traveled various travel routes (historical travel data, travel time data, road conditions, etc.).

In a first operation in accordance with the disclosure, the software application in the computer 106 may be executed in order to evaluate various vehicles that are available for assignment to various travel routes. Some or all of the available vehicles may then be assigned to one or more of various travel routes on the basis of various factors, including wear-and-tear conditions of the vehicles. The evaluation may involve obtaining information of various vehicles and/or travel routes from various sources such as, for example, the fleet records database 110, a vehicle computer, and/or through crowd-sourcing.

In an example implementation, the evaluation may include executing a simulation procedure that identifies wear-and-tear on one or more vehicles on one or more simulated travel routes. In some cases, the simulation procedure can use historical information obtained from the fleet records database 110. In some other cases, the simulation procedure can use information obtained from a vehicle computer, such as, for example, the vehicle computer 121 (when the electric vehicle 120 is traveling on a travel route, or after the electric vehicle 120 has completed a travel route). Additional details about evaluation and assignment of vehicles are described below.

In a second operation in accordance with the disclosure, a software application in a computer that is a part of the cloud computing system 141 may be executed in order to evaluate and assign various vehicles that are available for assignment to various travel routes. The procedures involved in execution of the software application in this computer can be similar to those described above with reference to the computer 106.

In a third operation in accordance with the disclosure, a software application in a vehicle computer may be executed in order to collect data during execution of a travel route by a vehicle. For example, a software application in the vehicle computer 121 may be executed in order to collect data during execution of a travel route by the electric vehicle 120. The software application may determine a first wear-and-tear rating of the electric vehicle 120 when (or after) traveling on a first travel route and a second wear-and-tear rating of the electric vehicle 120 when (or after) traveling on a different travel route. The vehicle computer 121 may communicate to the fleet records database 110 and/or to the computer 106, information such as, for example, the wear-and-tear ratings for the electric vehicle 120 on the two travel routes and historical data associated with the two travel routes (road details, time details, speed details, etc.).

In one example implementation, the computer 106 of the travel route assignment system 105 may evaluate the first wear-and-tear information provided by the vehicle computer 121 in real-time (or near real-time) when the electric vehicle 120 is traveling on the first travel route, and re-assign the electric vehicle 120 to a different travel route in order to minimize further wear-and-tear.

In another example implementation, the computer 106 of the travel route assignment system 105 may evaluate the first wear-and-tear information provided by the vehicle computer 121 after completing travel on the first travel route and re-assign the electric vehicle 120 to a different travel route in order to minimize further wear-and-tear. Additional details pertaining to assignments and re-assignments based on wear-and-tear ratings are provided below.

Figure 2:
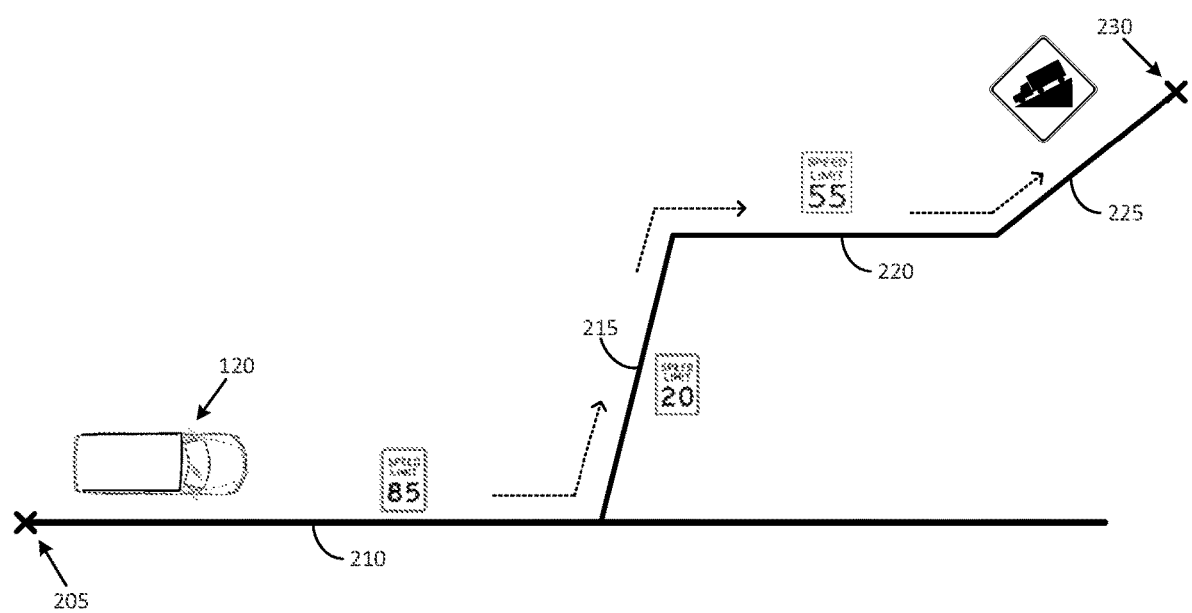
FIG. 2 shows an example travel route assignment for an alternative energy vehicle in accordance with an embodiment of the disclosure.

FIG. 2 shows an example travel route assignment for an alternative energy vehicle in accordance with the disclosure. In this example, the alternative energy vehicle is the electric vehicle 120 that has been assigned a travel route that extends from an origination location 205 to a destination location 230. The electric vehicle 120 is shown traveling on a road 210 that is an expressway with a posted speed limit of 85 mph. The wear-and-tear on the electric vehicle 120 is relatively high due to the high speed of travel on the road 210. One example factor that may contribute to the relatively high wear-and-tear on the road 210 can be heat that is generated in components such as an electric motor that drives one or more wheels of the electric vehicle 120, a battery that provides a large amount of power to the electric motor when the electric motor rotates at high speed, and brakes that may be employed to slow down or stop the electric vehicle 120 under various traffic conditions when traveling at high speed. Heat typically leads to various undesirable effects on these components, such as, for example, degraded component performance (reduction in power output from a battery, for example) and reduced mean-time-between-failures (MTBF).

The electric vehicle 120 may exit from the road 210 on to a road 215 in order to travel towards the destination location 230. The road 215 has a posted speed limit of 20 mph. The lower speed of the electric vehicle 120 on the road 215 leads to less wear-and-tear on the electric vehicle 120 than when the electric vehicle 120 is traveling at high speed on the road 210.

The road 220, which is the next travel segment of the travel route, is a highway with a posted speed limit of 55 mph. The wear-and-tear on the electric vehicle 120 on this stretch is less than that on the road 210 but more than that on the road 215.

The electric vehicle 120 may move from the road 220 to a road 225 having a road grade that is indicated by a traffic sign 226. The road grade in this example scenario, is an upwardly-inclined road grade with a gradient value that may or may not be indicated in the traffic sign 226. The wear-and-tear on the electric vehicle 120 is proportional to the road grade, with a steeper grade leading to a greater wear-and-tear in comparison to a lower grade. The wear-and-tear in this case, may primarily be caused by stress applied upon one or more electric motors that drive one or more wheels of the electric vehicle 120. The electric motor stress may be proportional to a greater torque that is applied to the wheels in order to counter the road grade and move the electric vehicle 120 upward.

The road grade in another example scenario may be a downward grade (when the electric vehicle 120 is traveling in the opposite direction on the road 225, for example, during a return trip). The wear-and-tear on the electric vehicle 120 is again proportional to the grade, with a steeper grade causing greater wear-and-tear than a lower gradient. The wear-and-tear in this case, may primarily be caused by stress on the brakes of the electric vehicle 120 and/or to the electric motors (to produce braking torque).

FIG. 3 shows a table 15 indicating example speed categories that may be used to determine wear-and-tear on an alternative energy vehicle in accordance with an example embodiment of the disclosure. More than, or less than, three speed categories may be used in other embodiments. A weighting factor may be assigned to each speed category. In an example implementation, each weighting factor can be a numerical value (such as 1, 2, and 3 shown in table 15). In another example implementation, each weighting factor can be a percentage value, and the sum of all the weighting factors for all the speed categories set equal to 100%.

FIG. 4 shows a table 20 that illustrates a first example determination of a wear-and-tear rating of an alternative energy vehicle based on speed-related battery stress, in an example scenario in accordance with the disclosure. In this example scenario, battery stress is indicated on the basis of the three speed categories and weighting factors illustrated in FIG. 3, and on the basis of various route segments of a travel route "A." The various route segments may be categorized as percentage values of travel times or distances on the travel route "A." The battery stress for each route segment may be indicated as a product of the weighting factor and the percentage value.

A first route segment of the travel route "A" can constitute, for example, 70% of the total route and conforms to the first speed category (speed <40 mph). One example of a route segment that falls under this speed category is the road 215 shown in FIG. 2. The battery stress imposed upon the battery of the alternative energy vehicle traversing the first route segment corresponds to 70 (product of weighting factor 1 and percentage 70).

A second route segment of the travel route "A" can constitute, for example, 20% of the total route and conforms to the second speed category (40 mph<speed <60 mph). One example of a route segment that falls under this speed category is the road 220 shown in FIG. 2. The battery stress imposed upon the battery of the alternative energy vehicle traversing the second route segment corresponds to 40 (product of weighting factor 2 and percentage 20).

A third route segment of the travel route "A" can constitute, for example, 10% of the total route and conforms to the third speed category (speed >60 mph). One example of a route segment that falls under this speed category is the road 210 shown in FIG. 2. The battery stress imposed upon the battery of the alternative energy vehicle traversing the third route segment corresponds to 30 (product of weighting factor 3 and percentage 10).

The wear-and-tear rating on the alternative energy vehicle for the travel route "A" in this example scenario is 140, which is the sum of the battery stresses imposed upon the battery of the alternative energy vehicle traversing the three route segments of the example travel route "A."

The wear-and-tear rating on the alternative energy vehicle can also be expressed as a cumulative wear-and-tear rating by including travel times for the travel route "A" in the wear-and-tear calculation. In an example approach, the cumulative wear-and-tear rating for the example scenario described above for the travel route "A" can be 140 multiplied by a travel time for the trip. For an example travel time of 15 minutes for the travel route "A," the cumulative wear-and-tear will be 2100 (i.e., 140×15). If the travel time was 65 minutes, the cumulative wear-and-tear will be 9100 (i.e., 140×65).

The wear-and-tear rating on the alternative energy vehicle can be further expressed as a cumulative wear-and-tear rating calculated over multiple trips on the travel route "A." In the example described above the cumulative wear-and-tear will be 11200 (i.e., 2100+9100) over two example trips on the travel route "A."

FIG. 5 shows a table 25 that illustrates a second example determination of a wear-and-tear rating on an alternative energy vehicle based on speed-related battery stress in another example scenario in accordance with the disclosure. In this example scenario, battery stress is indicated on the basis of the three speed categories and weighting factors illustrated in FIG. 3 and on the basis of various route segments of a travel route "B."

A first route segment of the travel route "B" can constitute, for example, 20% of the total route and conforms to the first speed category (speed <40 mph). The battery stress imposed upon the battery of the alternative energy vehicle traversing the first route segment corresponds to 20 (product of weighting factor 1 and percentage 20).

A second route segment of the travel route "B" can constitute, for example, 20% of the total route and conforms to the second speed category (40 mph<speed <60 mph). The battery stress imposed upon the battery of the alternative energy vehicle traversing the second route segment corresponds to 60 (product of weighting factor 2 and percentage 30).

A third route segment of the travel route "B" can constitute, for example, 50% of the total route and conforms to the third speed category (speed >60 mph). The battery stress imposed upon the battery of the alternative energy vehicle traversing the third route segment corresponds to 150 (product of weighting factor 3 and percentage 50).

The wear-and-tear rating of the alternative energy vehicle in this second example scenario is 230, which is the sum of the battery stresses imposed upon the battery of the alternative energy vehicle traversing the three route segments of the example travel route "B." The wear-and-tear rating of 230 imposed upon the alternative energy vehicle when traversing the travel route "B" is higher than the wear-and-tear rating of 140 imposed upon the alternative energy vehicle when traversing the travel route "A" because the third route segment constitutes 50% of the travel route "B" compared to 10% of the travel route "A." The higher speed translates to higher wear-and-tear.

The wear-and-tear rating on the alternative energy vehicle can also be expressed as a cumulative wear-and-tear rating by including travel times for the travel route "B" in the wear-and-tear calculation. In an example approach, the cumulative wear-and-tear rating for the example scenario described above for the travel route "B" can be 230 multiplied by a travel time for the trip. For an example travel time of 10 minutes for the travel route "B," the cumulative wear-and-tear will be 2300 (i.e., 230×10). If the travel time was 45 minutes, the cumulative wear-and-tear will be 10350 (i.e., 230×45). The wear-and-tear rating on the alternative energy vehicle can be further expressed as a cumulative wear-and-tear rating calculated over multiple trips on the travel route "B" in the manner described above for travel route "A." Cumulative wear-and-tear rating calculations may be applied to other scenarios described below as well.

In an embodiment in accordance with disclosure, travel route assignments for one or more alternative energy vehicles may be based on the wear-and-tear ratings shown in table 20 and table 25, and/or based on data obtained in real-time from an alternative energy vehicle when the alternative energy vehicle is traversing a travel route. In another embodiment in accordance with disclosure, travel route assignments for one or more alternative energy vehicles may be based on the wear-and-tear ratings shown in table 20 and table 25 and derived from computer simulations.

FIG. 6 shows a table 30 indicating example road grade categories that may be used to determine wear-and-tear on an alternative energy vehicle in accordance with an example embodiment of the disclosure. More than, or less than, three road grade categories may be used in other embodiments. A weighting factor may be assigned to each road grade category. In an example implementation, each weighting factor can be a numerical value (such as 1, 2, and 3 shown in table 30). In another example implementation, each weighting factor can be a percentage value and the sum of all the weighting factors for all the speed categories set equal to 100.

FIG. 7 shows a table 35 that illustrates a third example determination of a wear-and-tear rating on an alternative energy vehicle based on road grade-related electric motor stress in an example scenario in accordance with the disclosure. In this example scenario, motor stress (or brake stress) is indicated on the basis of the three road grade categories and weighting factors illustrated in FIG. 6 and on the basis of various route segments of a travel route "A." The various route segments may be categorized as percentage values of travel times or distances on the travel route "A." The motor stress for each route segment may be indicated as a product of the weighting factor and the percentage value.

A first route segment of the travel route "A" can constitute, for example, 80% of the total route and conforms to the first road grade category (grade <5%). The stress imposed upon one or more electric motors and/or brakes of the alternative energy vehicle traversing the first route segment corresponds to 80 (product of weighting factor 1 and percentage 80).

A second route segment of the travel route "A" can constitute, for example, 10% of the total route and conforms to the second road grade category (5%<grade <10%). The stress imposed upon one or more electric motors and/or brakes of the alternative energy vehicle traversing the second route segment corresponds to 20 (product of weighting factor 2 and percentage 10).

A third route segment of the travel route "A" can constitute, for example, 10% of the total route and conforms to the third road grade category (grade >10%). The stress imposed upon one or more electric motors and/or brakes of the alternative energy vehicle traversing the third route segment corresponds to 30 (product of weighting factor 3 and percentage 10).

The wear-and-tear rating on the alternative energy vehicle in this example scenario is 130, which is the sum of the stresses imposed upon the one or more electric motors of the alternative energy vehicle traversing the three route segments of the example travel route "A."

FIG. 8 shows a table 40 that illustrates a fourth example determination of a wear-and-tear rating on an alternative energy vehicle based on road grade-related electric motor stress in another example scenario in accordance with the disclosure. In this example scenario, motor stress (or brake stress) is indicated on the basis of the three road grade categories and weighting factors illustrated in FIG. 6 and on the basis of various route segments of a travel route "B."

A first route segment of the travel route "B" can constitute, for example, 20% of the total route and conforms to the first road grade category (grade <5%). The stress imposed upon one or more electric motors and/or brakes of the alternative energy vehicle traversing the first route segment corresponds to 20 (product of weighting factor 1 and percentage 20).

A second route segment of the travel route "B" can constitute, for example, 25% of the total route and conforms to the second road grade category (5%<grade <10%). The stress imposed upon one or more electric motors and/or brakes of the alternative energy vehicle traversing the second route segment corresponds to 50 (product of weighting factor 2 and percentage 25).

A third route segment of the travel route "B" can constitute, for example, 55% of the total route and conforms to the third road grade category (grade >10%). The stress imposed upon one or more electric motors and/or brakes of the alternative energy vehicle traversing the third route segment corresponds to 165 (product of weighting factor 3 and percentage 55).

The wear-and-tear rating on the alternative energy vehicle in this third example scenario is 235, which is the sum of the motor stresses and/or brake stresses imposed upon one or more electric motors and/or brakes of the alternative energy vehicle traversing the three route segments of the example travel route "B." The wear-and-tear rating of 235 imposed upon the alternative energy vehicle when traversing the travel route "B" is higher than the wear-and-tear rating of 130 imposed upon the alternative energy vehicle when traversing the travel route "A" because the third route segment (grade >10%) constitutes 55% of the travel route "B" compared to 10% of the travel route "A." The higher road grade translates to higher wear-and-tear.

In an embodiment in accordance with disclosure, travel route assignments for one or more alternative energy vehicles may be based on the wear-and-tear ratings shown in table 35 and table 40, and/or based on data obtained in real-time from an alternative energy vehicle when the alternative energy vehicle is traversing a travel route. In another embodiment in accordance with disclosure, travel route assignments for one or more alternative energy vehicles may be based on the wear-and-tear ratings shown in table 35 and table 40 and derived from computer simulations.

FIG. 9 shows a table 45 indicating example electric motor usage categories that may be used to determine wear-and-tear on an alternative energy vehicle in accordance with an example embodiment of the disclosure. More than, or less than, three electric motor usage categories may be used in other embodiments. A weighting factor may be assigned to each electric motor usage category. In an example implementation, each weighting factor can be a numerical value (such as 1, 2, and 3 shown in table 45). In another example implementation, each weighting factor can be a percentage value and the sum of all the weighting factors for all the speed categories set equal to 100.

FIG. 10 shows a table 50 that illustrates a fifth example determination of a wear-and-tear rating on an alternative energy vehicle based on electric motor use-related battery stress in an example scenario in accordance with the disclosure. In this example scenario, a stress on the battery of the alternative energy vehicle is indicated on the basis of the three electric motor usage categories and weighting factors illustrated in FIG. 9. More particularly, battery stress encountered on various route segments of a travel route "A" are indicated in table 50 by numerical values, each of which is a product of the weighting factor and battery consumption.

A first route segment of the travel route "A" can involve electric motor usage for providing low torque/low motor speed (such as, for example, traveling on the road 215 illustrated in FIG. 2). Battery consumption is relatively low and is proportional to a length and/or grade of the first route segment. The battery stress in this example is 5 (product of weighting factor 1 and 5 kWh battery consumption).

A second route segment of the travel route "A" can involve electric motor usage for providing medium torque/medium motor speed (such as, for example, traveling on the road 220 illustrated in FIG. 2). The battery consumption is 10 kWh in this case (proportional to a length and/or grade of the second route segment) and the battery stress is 20 (product of weighting factor 2 and 10 kWh battery consumption).

A third route segment of the travel route "A" can involve electric motor usage for providing high torque/high motor speed (such as, for example, high torque when traveling on the road 225 and high speed when traveling on the road 210 illustrated in FIG. 2). The battery consumption is 9 kWh in this case (proportional to a length and/or grade of the third route segment) and the battery stress is 27 (product of weighting factor 3 and 9 kWh battery consumption).

The wear-and-tear rating on the alternative energy vehicle in this example scenario is 52, which is the sum of the stresses imposed upon the battery of the alternative energy vehicle traversing the three route segments of the example travel route "A."

FIG. 11 shows a table 55 that illustrates a sixth example determination of a wear-and-tear rating on an alternative energy vehicle based on electric motor use-related battery stress in an example scenario in accordance with the disclosure. In this example scenario, a stress on the battery of the alternative energy vehicle is indicated on the basis of the three electric motor usage categories and weighting factors illustrated in FIG. 9. More particularly, battery stress encountered on various route segments of a travel route "B" are indicated in table 55 by numerical values, each of which is a product of the weighting factor and battery consumption.

A first route segment of the travel route "B" can involve electric motor usage for providing low torque/low motor speed. Battery consumption is relatively low and is proportional to a length and/or grade of the first route segment. The battery stress in this example is 2 (product of weighting factor 1 and 2 kWh battery consumption).

A second route segment of the travel route "B" can involve electric motor usage for providing medium torque/medium motor speed. The battery consumption is 15 kWh in this case (proportional to a length and/or grade of the second route segment) and the battery stress is 30 (product of weighting factor 2 and 15 kWh battery consumption).

A third route segment of the travel route "B" can involve electric motor usage for providing high torque/high motor speed. The battery consumption is 20 kWh in this case (proportional to a length and/or grade of the third route segment) and the battery stress is 60 (product of weighting factor 3 and 20 kWh battery consumption).

The wear-and-tear rating on the alternative energy vehicle in this example scenario is 92, which is the sum of the stresses imposed upon the battery of the alternative energy vehicle traversing the three route segments of the example travel route "B." The wear-and-tear rating of 92 imposed upon the alternative energy vehicle when traversing the travel route "B" is higher than the wear-and-tear rating of 52 imposed upon the alternative energy vehicle when traversing the travel route "A" because the third route segment (high torque/high speed) consumes 20 kWh of battery energy on travel route "B" compared to 9 kWh on travel route "A.". The higher battery consumption produces various negative effects upon the battery (such as, for example, reduced capacity, reduced reliability, and reduced life) and higher wear-and-tear on the alternative energy vehicle.

In an embodiment in accordance with disclosure, travel route assignments for one or more alternative energy vehicles may be based on the wear-and-tear ratings shown in table 50 and table 55, and/or based on data obtained in real-time from an alternative energy vehicle when the alternative energy vehicle is traversing a travel route. In another embodiment in accordance with disclosure, travel route assignments for one or more alternative energy vehicles may be based on the wear-and-tear ratings shown in table 50 and table 55 and derived from computer simulations.

FIG. 12 shows a table 60 indicating example battery use categories that may be used to determine wear-and-tear on an alternative energy vehicle in accordance with an example embodiment of the disclosure. More than, or less than, three battery use categories may be used in other embodiments. A weighting factor may be assigned to each battery use category. In an example implementation, each weighting factor can be a numerical value (such as 1, 2, and 3 shown in table 60). In another example implementation, each weighting factor can be a percentage value and the sum of all the weighting factors for all the speed categories set equal to 100.

FIG. 13 shows a table 65 that illustrates a seventh example determination of a wear-and-tear rating on an alternative energy vehicle based on battery use-related battery stress in an example scenario in accordance with the disclosure. In this example scenario, battery stress is indicated on the basis of the three battery use categories and weighting factors illustrated in FIG. 12 and on the basis of various route segments of a travel route "A." The various route segments may be categorized as percentage values of travel times or distances on the travel route "A." The battery stress for each route segment may be indicated as a product of the weighting factor and the percentage value.

A first route segment of the travel route "A" can constitute, for example, 50% of the total route and conforms to the first battery use category (low use). The battery stress imposed upon the battery of the alternative energy vehicle traversing the first route segment corresponds to 50 (product of weighting factor 1 and percentage 50).

A second route segment of the travel route "A" can constitute, for example, 40% of the total route and conforms to the second battery use category (medium use). The battery stress imposed upon the battery of the alternative energy vehicle traversing the second route segment corresponds to 80 (product of weighting factor 2 and percentage 40).

A third route segment of the travel route "A" can constitute, for example, 10% of the total route and conforms to the third battery use category (high use). The battery stress imposed upon the battery of the alternative energy vehicle traversing the third route segment corresponds to 30 (product of weighting factor 3 and percentage 10).

The wear-and-tear rating on the alternative energy vehicle in this example scenario is 160, which is the sum of the stresses imposed upon the battery of the alternative energy vehicle traversing the three route segments of the example travel route "A."

FIG. 14 shows a table 70 that illustrates an eighth example determination of a wear-and-tear rating on an alternative energy vehicle based on battery use-related battery stress in an example scenario in accordance with the disclosure. In this example scenario, battery stress is indicated on the basis of the three battery use categories and weighting factors illustrated in FIG. 12 and on the basis of various route segments of a travel route "B." The various route segments may be categorized as percentage values of the travel route "B." The battery stress for each route segment may be indicated as a product of the weighting factor and the percentage value.

A first route segment of the travel route "B" can constitute, for example, 10% of the total route and conforms to the first battery use category (low use). The battery stress imposed upon the battery of the alternative energy vehicle traversing the first route segment corresponds to 10 (product of weighting factor 1 and percentage 10).

A second route segment of the travel route "B" can constitute, for example, 25% of the total route and conforms to the second battery use category (medium use). The battery stress imposed upon the battery of the alternative energy vehicle traversing the second route segment corresponds to 50 (product of weighting factor 2 and percentage 25).

A third route segment of the travel route "B" can constitute, for example, 65% of the total route and conforms to the third battery use category (high use). The battery stress imposed upon the battery of the alternative energy vehicle traversing the third route segment corresponds to 195 (product of weighting factor 3 and percentage 65).

The wear-and-tear rating on the alternative energy vehicle in this example scenario is 255, which is the sum of the stresses imposed upon the battery of the alternative energy vehicle traversing the three route segments of the example travel route "B." The wear-and-tear rating of 255 imposed upon the alternative energy vehicle when traversing the travel route "B" is higher than the wear-and-tear rating of 160 imposed upon the alternative energy vehicle when traversing the travel route "A" because of the high battery stress on the third route segment that constitutes 65% of the travel route "B" compared to 10% of the travel route "A." The higher battery stress translates to higher wear-and-tear.

In an embodiment in accordance with disclosure, travel route assignments for one or more alternative energy vehicles may be based on the wear-and-tear ratings shown in table 65 and table 70, and/or based on data obtained in real-time from an alternative energy vehicle when the alternative energy vehicle is traversing a travel route. In another embodiment in accordance with disclosure, travel route assignments for one or more alternative energy vehicles may be based on the wear-and-tear ratings shown in table 65 and table 70 and derived from computer simulations.

The wear-and-tear rating calculations described above with reference to travel route "A" and travel route "B" can be extended to any number and any type of travel routes and travel times such as, for example, travel routes and travel times applicable to an alternative energy vehicle used to provide ride share services, where the parameters of each trip are defined by various customers (route, distance, time, etc.). A cumulative wear-and-tear rating for the alternative energy vehicle may be determined on the basis of real-time data obtained over one or more trips provided for one or more customers. The cumulative wear-and-tear ratings for each alternative energy vehicle in a fleet of alternative energy vehicles can be used for travel route assignments in the manner described below with reference to FIG. 15.

FIG. 15 shows an example table 75 that shows travel route assignments for several alternative energy vehicles over several time periods in accordance with an embodiment of the disclosure. The table 75 shows travel route assignments for five alternative energy vehicles over three time periods in an example scenario. The time periods can be of any duration (days, weeks, months, years, etc.) and do not have to be necessarily arranged in any particular order. In other scenarios, less than, or more than, five alternative energy vehicles may be assigned to less than, or more than five travel routes over time periods that are less than, or more than three time periods. Furthermore, more than one alternative energy vehicle may be assigned to a travel route, such as, for example, a fleet of alternative energy vehicles may be assigned to a travel route. Some travel routes may be placed out of consideration during some or all time periods, such as, for example, a travel route may be excluded at all times or during certain times of the year due to extreme weather conditions.

Travel route assignments for one or more alternative energy vehicles may be based on wear-and-tear ratings of the alternative energy vehicles on one or more travel routes in accordance with the disclosure. The assignments may be made on the basis of wear-and-tear ratings determined in one or more of various ways such as, for example, the ways described above with reference to table 20, table 25, table 35, table 40, table 50, table 55, table 65, and/or table 70.

In an example implementation, "Time period 1" can extend from January through April. During this time period, Vehicle A is assigned to Travel Route 1, Vehicle B is assigned to Travel Route 2, Vehicle C is assigned to Travel Route 3, Vehicle D is assigned to Travel Route 4, and Vehicle E is assigned to Travel Route 5.

"Time period 2" can extend from May through August. During this time period, one or more of the alternative energy vehicles may be reassigned to other travel routes, or remain assigned to previously assigned travel routes. The travel route assignments for "Time period 2" can be based on based on wear-and-tear ratings determined on the travel routes during "Time period 1" and/or on the basis of other considerations (economic factors, business factors, cost considerations, computer simulations, etc.). In this example implementation, Vehicle A is re-assigned to Travel Route 2, Vehicle B is re-assigned to Travel Route 3, Vehicle C is re-assigned to Travel Route 4, Vehicle D is re-assigned to Travel Route 5, and Vehicle E is re-assigned to Travel Route 1.

"Time period 3" can extend from September through December. During this time period, one or more of the alternative energy vehicles may be reassigned to other travel routes, remain assigned to previously assigned travel routes, and/or some travel routes may be abandoned. The travel route assignments for "Time period 3" can be based on wear-and-tear ratings determined on the travel routes during "Time period 1" and/or "Time period 2" and/or on the basis of other considerations (economic factors, business factors, cost considerations, computer simulations, crowd-sourced wear-and-tear data, etc.). In an example case, the travel route assignments for "Time period 3" (and/or other time periods) may be determined on the basis of equalizing and/or distributing wear-and-tear across various alternative energy vehicles.

In this example implementation, Travel Route 1 is abandoned during "Time period 3, due to one or more reasons such as, for example, extreme weather conditions and/or other considerations, including on the basis of determining that alternative energy vehicles traveling on Travel Route 1 suffered excessive wear-and-tear. In an example implementation, the excessive wear-and-tear may be determined by evaluating Vehicle A during Time Period 1 and/or Vehicle E during Time Period 2.

As for the other travel routes, Vehicle E and Vehicle B are assigned to Travel Route 2, Vehicle A is assigned to Travel Route 3, and Vehicle C is assigned to Travel Route 4. Vehicle D is taken out of service and replaced by a Vehicle F on Travel Route 5. In one case, Vehicle D may be taken out of service when a wear-and-tear rating of the Vehicle D exceeds a threshold value. The threshold value may be set by various entities such as, for example, by a fleet operator.

Figure 16:
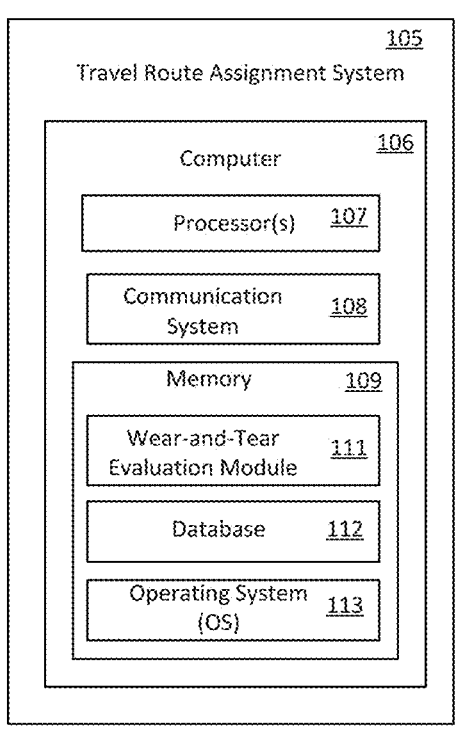
FIG. 16 shows some example components that may be included in a computer of a travel route assignment system in accordance with an embodiment of the disclosure.

FIG. 16 shows some example components that may be included in the computer 106 of the travel route assignment system 105 (shown in FIG. 1) in accordance with an embodiment of the disclosure. The computer 106 may include various components such as, for example, a processor 107, a communications system 108, and a memory 109. The communications system 108 is configured to allow the computer 106 to communicate with various apparatuses, such as, for example, the fleet records database 110, the cloud computing system 141 and one or more of the vehicle computers (such as, for example, the vehicle computer 121 of the electric vehicle 120).

The memory 109, which is one example of a non-transitory computer-readable medium, may be used to store an operating system (OS) 113, a database 112, and various code modules such as, for example, a wear-and-tear evaluation module 111. The code modules are provided in the form of computer-executable instructions that can be executed by the processor 107 for performing various operations in accordance with the disclosure.

The wear-and-tear evaluation module 111, which can be a software application that is downloaded into the computer 106, may be executed by the processor 107 in order to perform various operations such as determining wear-and-tear ratings of one or more alternative energy vehicles with respect to one or more travel routes. Some example procedures for determining wear-and-tear ratings have been described above.

The database 112 may be used to store various types of data such as, for example, travel route information, vehicle wear-and-tear data logged by one or more alternative energy vehicles during travel on various travel routes, and simulation data for use by the wear-and-tear evaluation module 111 to determine vehicle wear-and-tear.

Figure 17:
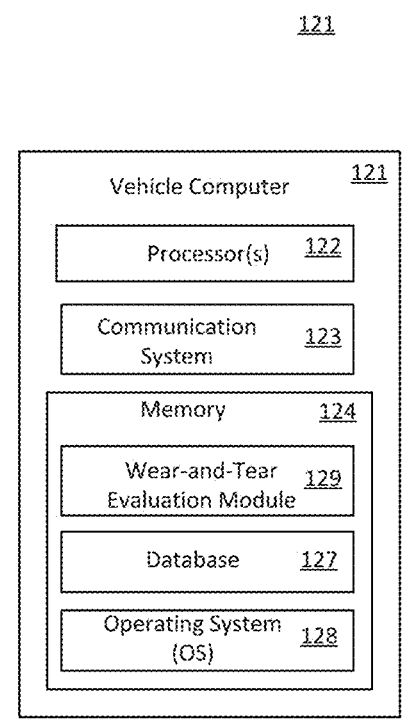
FIG. 17 shows some example components that may be included in a vehicle computer of an alternative energy vehicle in accordance with an embodiment of the disclosure.

FIG. 17 shows some example components that may be included in a vehicle computer (vehicle computer 121, in this example) in accordance with an embodiment of the disclosure. The vehicle computer 121 may include various components such as, for example, a processor 122, a communications system 123, and a memory 124. The communications system 123 is configured to allow the vehicle computer 121 to communicate with various apparatuses, such as, for example, the fleet records database 110, the cloud computing system 141 and the computer 106 of the travel route assignment system 105.

The memory 124, which is anther example of a non-transitory computer-readable medium, may be used to store an operating system (OS) 128, a database 127, and various code modules such as, for example, a wear-and-tear evaluation module 129. The code modules are provided in the form of computer-executable instructions that can be executed by the processor 122 for performing various operations in accordance with the disclosure.

The wear-and-tear evaluation module 129, which can be a software application that is downloaded into the computer 106, may be executed by the processor 122 in order to perform various operations such as determining wear-and-tear ratings of the alternative energy vehicle (electric vehicle 120, in this example) when the alternative energy vehicle is traveling on a travel route. Some example procedures for determining wear-and-tear ratings have been described above. The database 127 may be used to store various types of data such as, for example, travel route information and vehicle wear-and-tear data logged during travel on a travel route.

Figure 18:
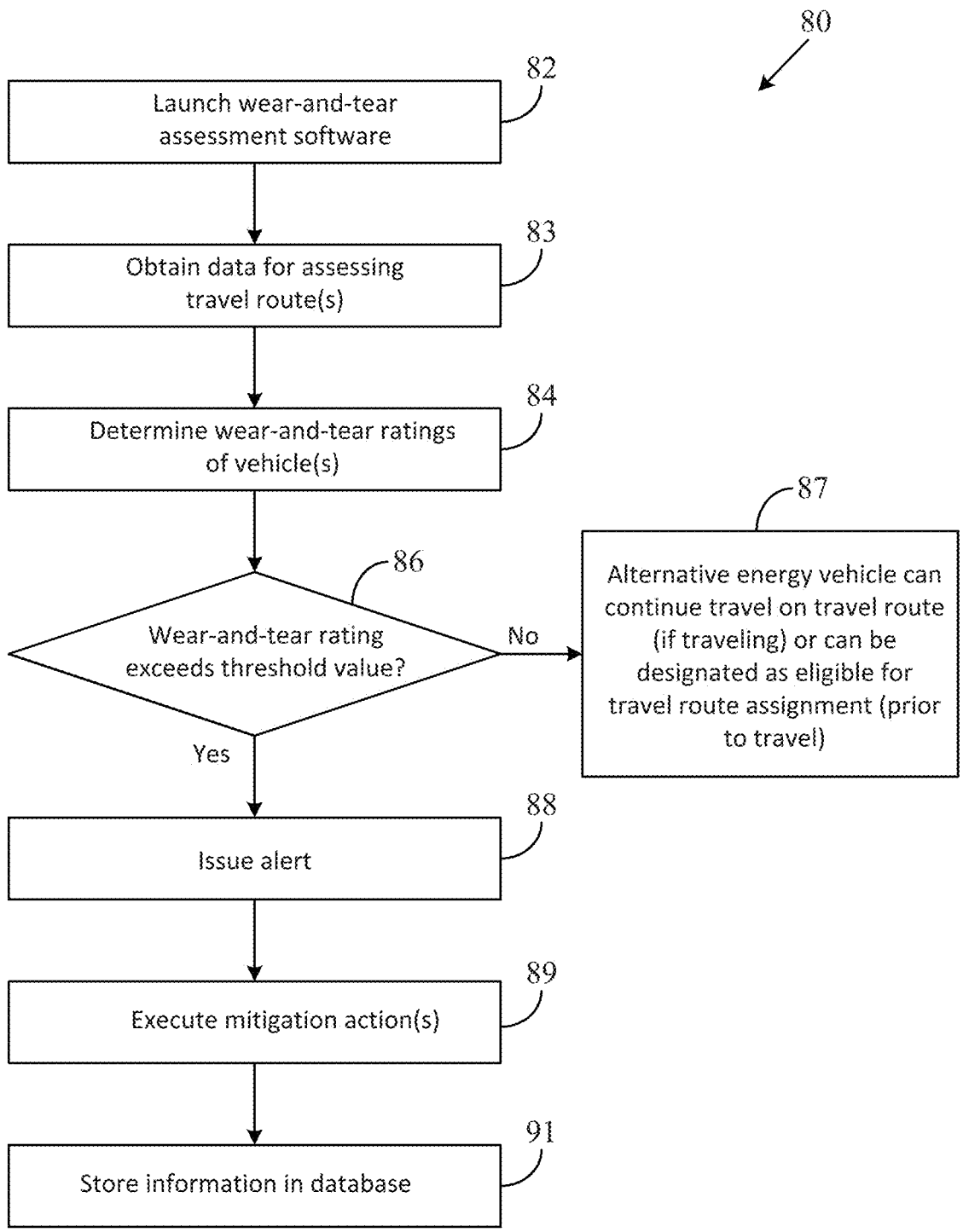
FIG. 18 shows a flowchart of an example method to evaluate an alternative energy vehicle assigned to a travel route.

FIG. 18 illustrates a flowchart 80 of an example wear-and-tear procedure in accordance with an embodiment of the disclosure. The flowchart 80 illustrates a sequence of operations that can be implemented in hardware, software, or a combination thereof. In the context of software, the operations represent computer-executable instructions stored on one or more non-transitory computer-readable media, such as the memory 109 in the computer 106, that, when executed by one or more processors, such as the processor 107 in the computer 106, perform the recited operations. One example of a software containing such computer-executable instructions is the software application provided in the computer 106. Generally, computer-executable instructions include routines, programs, objects, components, data structures, and the like that perform particular functions or implement particular abstract data types. The order in which the operations are described is not intended to be construed as a limitation, and any number of the described operations may be carried out in a different order, omitted, combined in any order, and/or carried out in parallel.

At block 82, a wear-and-tear software program is launched in one or more of various computers such as, for example, the computer 106 of the travel route assignment system 105, a computer in the cloud computing system 141, a vehicle computer (such as, for example, the vehicle computer 121), and/or a personal communication device (a smartphone, for example) of an individual (such as, for example, a driver of an alternative energy vehicle or an administrator of a fleet of vehicles). The wear-and-tear software program can be any of various programs such as, for example, the wear-and-tear evaluation module 111 in the computer 106 or the wear-and-tear evaluation module 129 in the vehicle computer 121.

At block 83, data associated with one or more travel routes and/or one or more alternative energy vehicles may be obtained. For example, the computer 106 may obtain the data (if such data is not already available in the database 112) by using the communication system 108 to communicate with the fleet records database 110, the cloud computing system 141, and/or one or more vehicle computers. A few examples of the kind of data that may be obtained can include vehicle history data, driver history, driver availability, and travel route data such as, for example, speed limits, road grades, and weather. In an example implementation, data may also be obtained from drivers of various alternative energy vehicles.

At block 84, wear-and-tear ratings of one or more alternative energy vehicles may be determined. A few example methods of determining wear-and-tear ratings have been described above.

At block 86, a determination is made whether a wear-and-tear rating of an alternative energy vehicle exceeds a threshold value. This threshold value can be determined by a multitude of sources including but not limited to: OEM parameters, vehicle and/or component performance data, and data from other vehicles within the same fleet.

If the wear-and-tear rating does not exceed the threshold value, at block 87, the alternative energy vehicle can continue traveling on a travel route (if the alternative energy vehicle is already traveling on the travel route). In some scenarios, the alternative energy vehicle may be assigned a travel route (if the alternative energy vehicle is awaiting an assignment of a travel route).

If at block 86, it is determined that the wear-and-tear rating exceeds the threshold value, at block 88, an alert may be issued to one or more of various entities such as, for example, a driver of an alternative energy vehicle and/or a fleet manager. In an example implementation, a recommendation for addressing the wear-and-tear of the alternative energy vehicle may be issued in lieu of, or in addition to, the alert. Some examples can include a recommendation to minimize further wear-and-tear by changing a travel route, modifying a length or a duration of travel on a travel route, and replacing the alternative energy vehicle with another vehicle that has a lower wear-and-tear rating. Replacing of one alternative energy vehicle with another may be directed at spreading/balancing wear-and-tear across multiple alternative energy vehicles (such as across multiple alternative energy vehicles of a fleet).

At block 89, mitigation actions can be executed such as, for example, on the basis of the recommendations.

At block 91, information pertaining to the alternative energy vehicle and/or a travel route may be stored. For example, information pertaining to a travel route (speed on various roads, road grades, battery consumption, motor usage, motor drive characteristics, etc.) may be stored in one or more storage elements such as, for example, the database 112 of the computer 106, the database 127 of the vehicle computer 121, the fleet records database 110, and/or the cloud computing system 141.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize one or more devices that include hardware, such as, for example, one or more processors and system memory, as discussed herein. An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of non-transitory computer-readable media.

Computer-executable instructions comprise, for example, instructions and data which, when executed at a processor, cause the processor to perform a certain function or group of functions. The computer-executable instructions may be, for example, binaries, intermediate format instructions, such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

A memory device, such as the memory 109 provided in the computer 106 of the travel route assignment system 105 or in a vehicle computer, can include any one memory element or a combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory device may incorporate electronic, magnetic, optical, and/or other types of storage media. In the context of this document, a "non-transitory computer-readable medium" can be, for example but not limited to, an electronic, magnetic, optical, electromagnetic, infrared, or semiconductor system, apparatus, or device. More specific examples (a non-exhaustive list) of the computer-readable medium would include the following: a portable computer diskette (magnetic), a random-access memory (RAM) (electronic), a read-only memory (ROM) (electronic), an erasable programmable read-only memory (EPROM, EEPROM, or Flash memory) (electronic), and a portable compact disc read-only memory (CD ROM) (optical). Note that the computer-readable medium could even be paper or another suitable medium upon which the program is printed, since the program can be electronically captured, for instance, via optical scanning of the paper or other medium, then compiled, interpreted or otherwise processed in a suitable manner if necessary, and then stored in a computer memory.

Those skilled in the art will appreciate that the present disclosure may be practiced in network computing environments with many types of computer system configurations, including in-dash vehicle computers, personal computers, desktop computers, laptop computers, message processors, personal communication devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description, and claims refer to particular system components. As one skilled in the art will appreciate, components may be referred to by different names. This document does not intend to distinguish between components that differ in name, but not function.

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described example embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method comprising:
simultaneously assigning, using one or more processors, a plurality of vehicles to a plurality of travel routes for a first number of trips over a first period of time;
capturing data in real-time by vehicle computers of the plurality of vehicles while the plurality of vehicles are traversing the plurality of travel routes;
determining, using the one or more processors, first vehicle speed ranges for first segments of the plurality of travel routes and second vehicle speed ranges for second segments of the plurality of travel routes;
determining, using the one or more processors, first weight values associated with the first segments of the plurality of travel routes based on the first vehicle speed ranges, and second weight values associated with the second segments of the plurality of travel routes based on the second vehicle speed ranges;
determining, using the one or more processors, first percentages of the plurality of travel routes associated with the first vehicle speed ranges and second percentages of the plurality of travel routes associated with the second vehicle speed ranges;
determining, using the one or more processors and based on multiplying the first weighting values and the first percentages, first vehicle battery stress values;
determining, using the one or more processors and based on multiplying the second weighting values and the second percentages, second vehicle battery stress values;
determining, using the one or more processors wear-and-tear ratings of the plurality of vehicles based on a sum of the first vehicle battery stress values and the second vehicle battery stress values while the plurality of vehicles are traversing the plurality of travel routes;
determining, using the one or more processors, that first wear-and-tear rating of the wear-and-tear ratings exceeds a threshold value, wherein the first wear-and-tear rating is associated with a first travel route of the plurality of travel routes;
determining, using the one or more processors, that a second wear-and-tear rating of the wear-and-tear ratings is less than a threshold value, wherein the second wear-and-tear rating is associated with a second travel route of the plurality of travel routes;
and remotely re-assigning, using the one or more processors, based on the first wear-and-tear rating exceeding the threshold value and the second wear-and-tear rating being less than the threshold value, and while a vehicle of the plurality of vehicles is traversing the first travel route, the vehicle to the second travel route for a second number of trips over a second period of time, wherein the second travel route is different than the first travel route.

2. A method comprising:
simultaneously assigning, using one or more processors, a plurality of vehicles to a plurality of travel routes for a first number of trips over a first period of time;
capturing data in real-time by vehicle computers of the plurality of vehicles while the plurality of vehicles are traversing the plurality of travel routes;
determining, using the one or more processors, first vehicle speed ranges for first segments of the plurality of travel routes, second vehicle speed ranges for second segments of the plurality of travel routes, and third vehicle speed ranges for third segments of the plurality of travel routes;
determining, using the one or more processors, first weight values associated with the first segments of the plurality of travel routes based on the first vehicle speed ranges, second weight values associated with the second segments of the plurality of travel routes based on the second vehicle speed ranges, and third weight values associated with the third segments of the plurality of travel routes based on the third vehicle speed ranges;
determining, using the one or more processors, first percentages of the plurality of travel routes associated with the first vehicle speed ranges, second percentages of the plurality of travel routes associated with the second vehicle speed ranges, and third percentages of the plurality of travel routes associated with the third vehicle speed ranges;
determining, using the one or more processors and based on multiplying the first weighting values and the first percentages, first vehicle battery stress values;
determining, using the one or more processors and based on multiplying the second weighting values and the second percentages, second vehicle battery stress values;
determining, using the one or more processors and based on multiplying the third weighting values and the third percentages, third vehicle battery stress values;
determining, using the one or more processors, wear-and-tear ratings of the plurality of vehicles based on a sum of the first vehicle battery stress values, the second vehicle battery stress values, and the third vehicle battery stress values while the plurality of vehicles are traversing the plurality of travel routes;
determining, using the one or more processors, that a first wear-and-tear rating of the wear-and-tear ratings exceeds a threshold value, wherein the first wear-and-tear rating is associated with a first travel route of the plurality of travel routes;
determining, using the one or more processors, that a second wear-and-tear rating of the wear-and-tear ratings is less than a threshold value, wherein the second wear-and-tear rating is associated with a second travel route of the plurality of travel routes; and
remotely re-assigning, using the one or more processors, based on the first wear-and-tear rating exceeding the threshold value and the second wear-and-tear rating being less than the threshold value, and while a vehicle of the plurality of vehicles is traversing the first travel route, the vehicle to the second travel route for a second number of trips over a second period of time, wherein the second travel route is different than the first travel route.

3. The method of claim 2, further comprising:
determining a stress imposed upon an electric motor of the vehicle, wherein the stress is proportional in part to a grade of a road on the first travel route.

4. The method of claim 3, determining the first wear-and-tear rating of the vehicle is based on the stress imposed upon the electric motor.

5. The method of claim 3, wherein determining the stress imposed upon the electric motor of the vehicle traversing the first travel route comprises:
executing a simulation procedure, monitoring the electric motor, and/or obtaining crowd-sourced information of the first travel route.

6. A system comprising:
memory that stores computer-executable instructions; and
one or more processors configured to access the memory and execute the computer-executable instructions to:
simultaneously assign, using one or more processors, a plurality of vehicles to a plurality of travel routes for a first number of trips over a first period of time;
capture data in real-time by vehicle computers of the plurality of vehicles while the plurality of vehicles are traversing the plurality of travel routes;
determine, using the one or more processors, first vehicle speed ranges for first segments of the plurality of travel routes and second vehicle speed ranges for second segments of the plurality of travel routes;
determine, using the one or more processors, first weight values associated with the first segments of the plurality of travel routes based on the first vehicle speed ranges, and second weight values associated with the second segments of the plurality of travel routes based on the second vehicle speed ranges;
determine, using the one or more processors, first percentages of the plurality of travel routes associated with the first vehicle speed ranges and second percentages of the plurality of travel routes associated with the second vehicle speed ranges;
determine, using the one or more processors and based on multiplying the first weighting values and the first percentages, first vehicle battery stress values;
determine, using the one or more processors and based on multiplying the second weighting values and the second percentages, second vehicle battery stress values;
determine, using the one or more processors, wear-and-tear ratings of the plurality of vehicles based on a sum of the first vehicle battery stress values and the second vehicle battery stress values while the plurality of vehicles are traversing the plurality of travel routes;
determine, using the one or more processors, that a first wear-and-tear rating of the wear-and-tear ratings exceeds a threshold value, wherein the first wear-and-tear rating is associated with a first travel route of the plurality of travel routes;
determine, using the one or more processors, that a second wear-and-tear rating of the wear-and-tear ratings is less than a threshold value, wherein the second wear-and-tear rating is associated with a second travel route of the plurality of travel routes;
and remotely re-assign, using the one or more processors, based on the first wear-and-tear rating exceeding the threshold value and the second wear-and-tear rating being less than the threshold value, and while a vehicle of the plurality of vehicles is traversing the first travel route, the vehicle to the second travel route for a second number of trips over a second period of time,
wherein the second travel route is different than the first travel route.

* * * * *